(12) United States Patent
Iida

(10) Patent No.: US 9,218,238 B2
(45) Date of Patent: Dec. 22, 2015

(54) CONTENTS DATA RECORDING APPARATUS AND CONTENTS DATA RECORDING METHOD

(75) Inventor: Shingo Iida, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 806 days.

(21) Appl. No.: 13/019,516

(22) Filed: Feb. 2, 2011

(65) Prior Publication Data

US 2011/0231714 A1    Sep. 22, 2011

(30) Foreign Application Priority Data

Mar. 17, 2010  (JP) .................................. 2010-061530

(51) Int. Cl.
*G06F 11/10* (2006.01)

(52) U.S. Cl.
CPC ...................................... *G06F 11/10* (2013.01)

(58) Field of Classification Search
CPC ........... G11B 2020/10759; G11B 2020/10981; G11B 20/1803; G06F 11/2094; G06F 11/008; G11C 16/3418; H04N 19/85; H04N 19/89
USPC .................... 714/6.23, 6.24, 11, 49
See application file for complete search history.

(56) References Cited

U.S. PATENT DOCUMENTS

| | | | | |
|---|---|---|---|---|
| 5,642,242 A * | 6/1997 | Ozaki et al. | ..................... | 360/48 |
| 5,978,029 A * | 11/1999 | Boice et al. | ............. | 375/240.14 |
| 6,108,728 A * | 8/2000 | Kobayashi | ..................... | 710/74 |
| 6,304,991 B1 * | 10/2001 | Rowitch et al. | ............... | 714/755 |
| 7,072,393 B2 * | 7/2006 | Boice et al. | ............. | 375/240.01 |
| 7,627,842 B1 * | 12/2009 | Khoo et al. | .................... | 716/106 |
| 8,301,948 B2 * | 10/2012 | Blaum et al. | .................... | 714/746 |
| 8,879,857 B2 * | 11/2014 | Raveendran et al. | ......... | 382/232 |
| 2004/0240553 A1 * | 12/2004 | Kurihara et al. | ......... | 375/240.16 |
| 2007/0047843 A1 * | 3/2007 | Kazama | ........................ | 382/305 |
| 2008/0215911 A1 * | 9/2008 | Chang | ................ | 714/5 |
| 2008/0273598 A1 * | 11/2008 | Shon et al. | ............... | 375/240.24 |
| 2009/0033760 A1 * | 2/2009 | Oh et al. | ..................... | 348/222.1 |
| 2009/0122867 A1 * | 5/2009 | Mauchly et al. | ......... | 375/240.16 |
| 2009/0132890 A1 * | 5/2009 | Hetzler et al. | ................ | 714/763 |

(Continued)

FOREIGN PATENT DOCUMENTS

| | | |
|---|---|---|
| JP | 06-076491 | 3/1994 |
| JP | 11-316655 | 11/1999 |
| JP | 2006-245867 | 9/2006 |
| JP | 2008-054298 A | 3/2008 |

OTHER PUBLICATIONS

Notification for Filing Opinion issued by the Korea Intellectual Property Office in Korea Patent Application No. 10-2011-0016715, mailed Jun. 20, 2012 (3 pages).

(Continued)

*Primary Examiner* — Loan L. T. Truong

(74) *Attorney, Agent, or Firm* — Finnegan, Henderson, Farabow, Garrett & Dunner, LLP

(57) ABSTRACT

According to one embodiment, a contents data recording apparatus includes a storage module and a data delete module. The storage module stores encoded first-system and second-system contents data. The data delete module deletes either the first-system contents data or second-system contents data from the storage module based on a predetermined condition after the first-system and second-system contents data has been stored in the storage module.

13 Claims, 6 Drawing Sheets

(56) References Cited

U.S. PATENT DOCUMENTS

| | | | |
|---|---|---|---|
| 2009/0249168 A1* | 10/2009 | Inoue | 714/763 |
| 2009/0323802 A1* | 12/2009 | Walters et al. | 375/240.01 |
| 2010/0007793 A1* | 1/2010 | Kapoor | 348/571 |
| 2010/0067864 A1* | 3/2010 | De Waele et al. | 386/52 |
| 2010/0131821 A1* | 5/2010 | Takagi et al. | 714/756 |
| 2010/0229033 A1* | 9/2010 | Maeda et al. | 714/7 |
| 2011/0085551 A1* | 4/2011 | Sridhar et al. | 370/392 |
| 2011/0126241 A1* | 5/2011 | Beattie et al. | 725/62 |

OTHER PUBLICATIONS

Notification for Filing Opinion issued by the Korean Intellectual Property Office in Korean Application No. 10-2011-0016715, mailed Mar. 29, 2013, 4 pages.

Notice of Reasons for Rejection issued by the Japanese Patent Office in Japanese Patent Application No. 2010-061530, mailed Jan. 17, 2012 (3 pages).

* cited by examiner

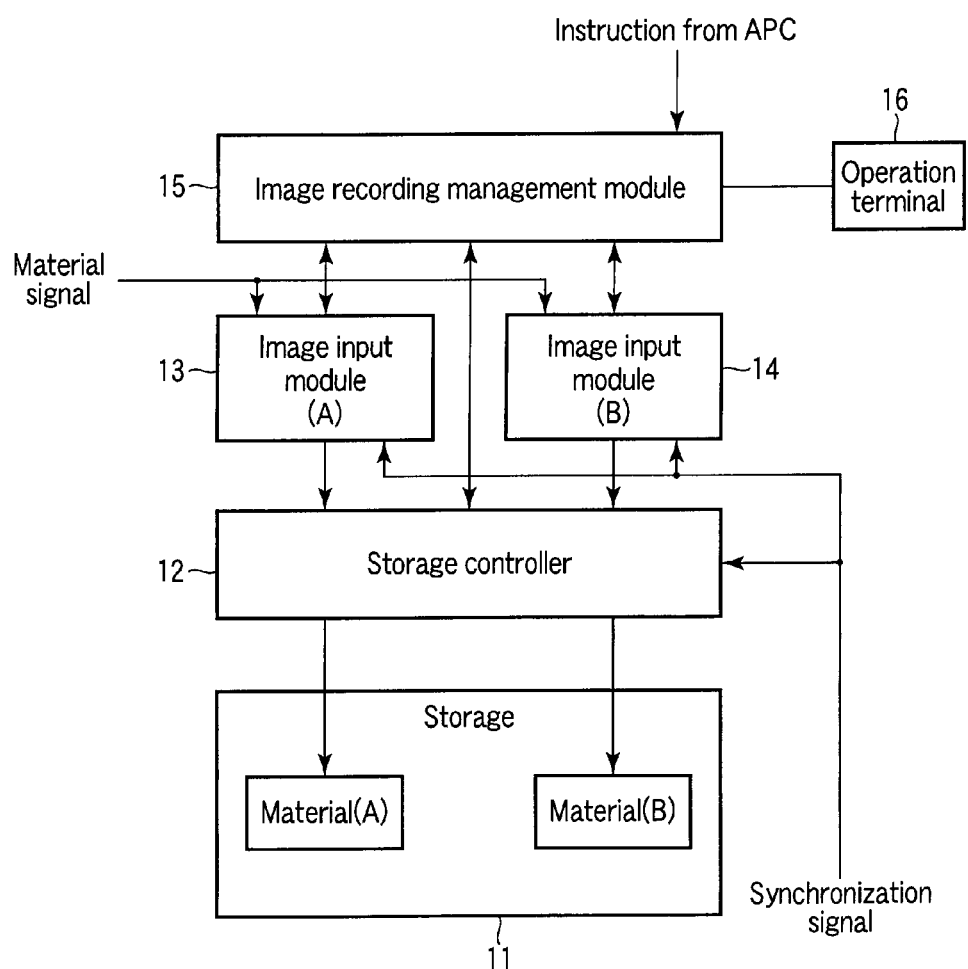
F I G. 1

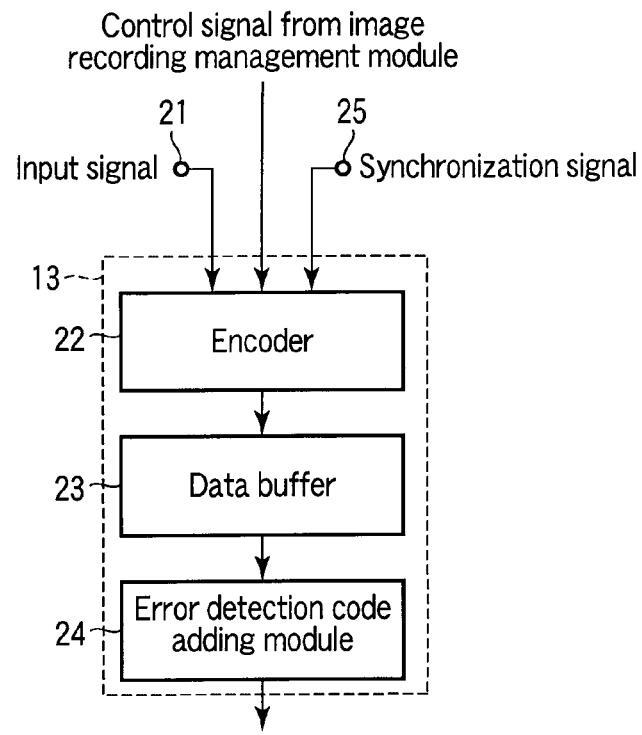
F I G. 2
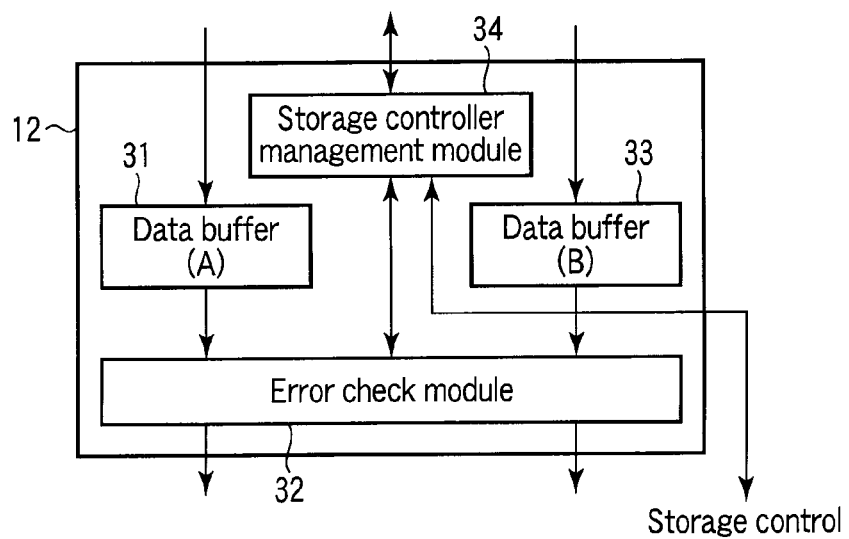
F I G. 3

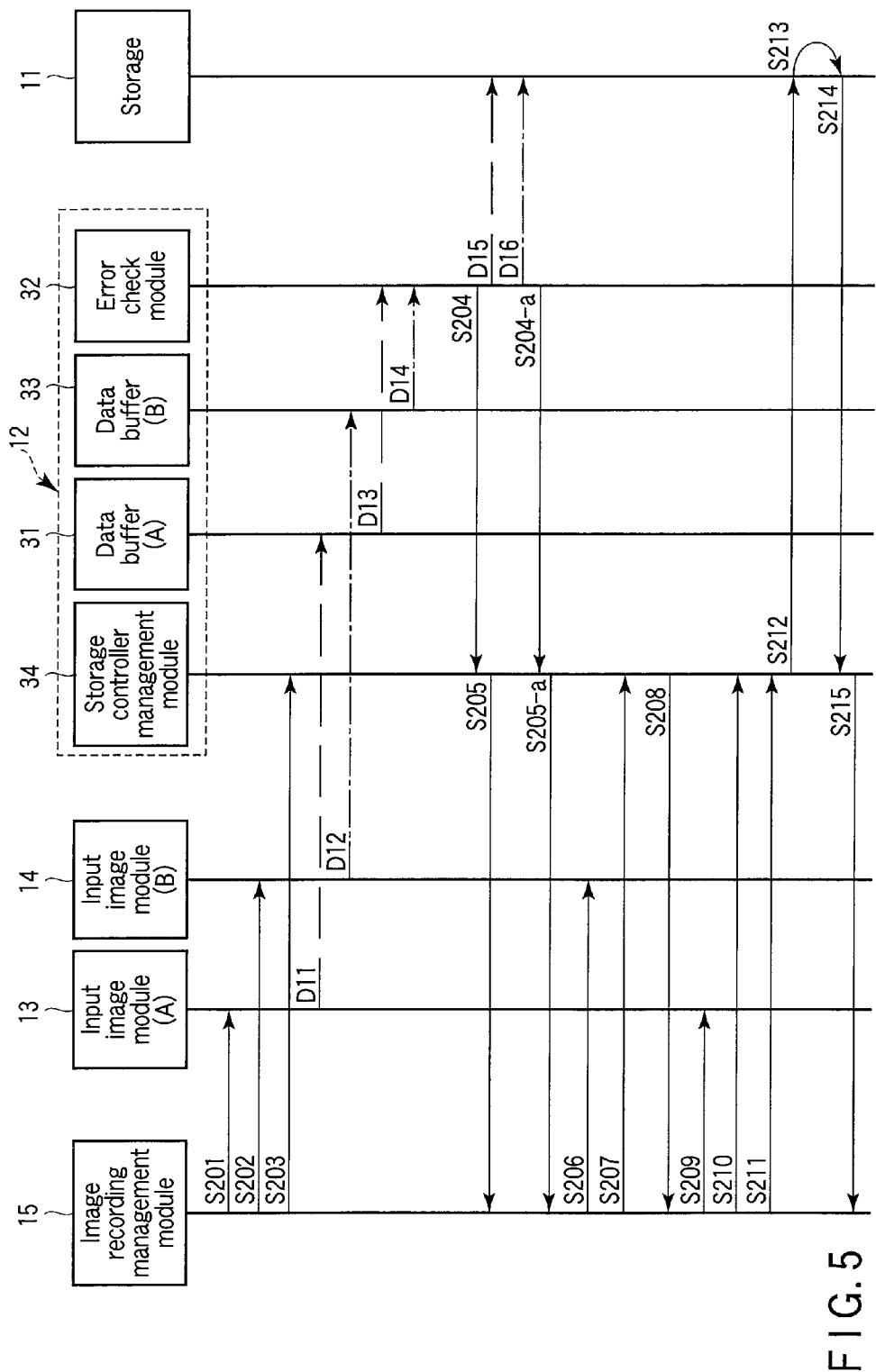
F I G. 5

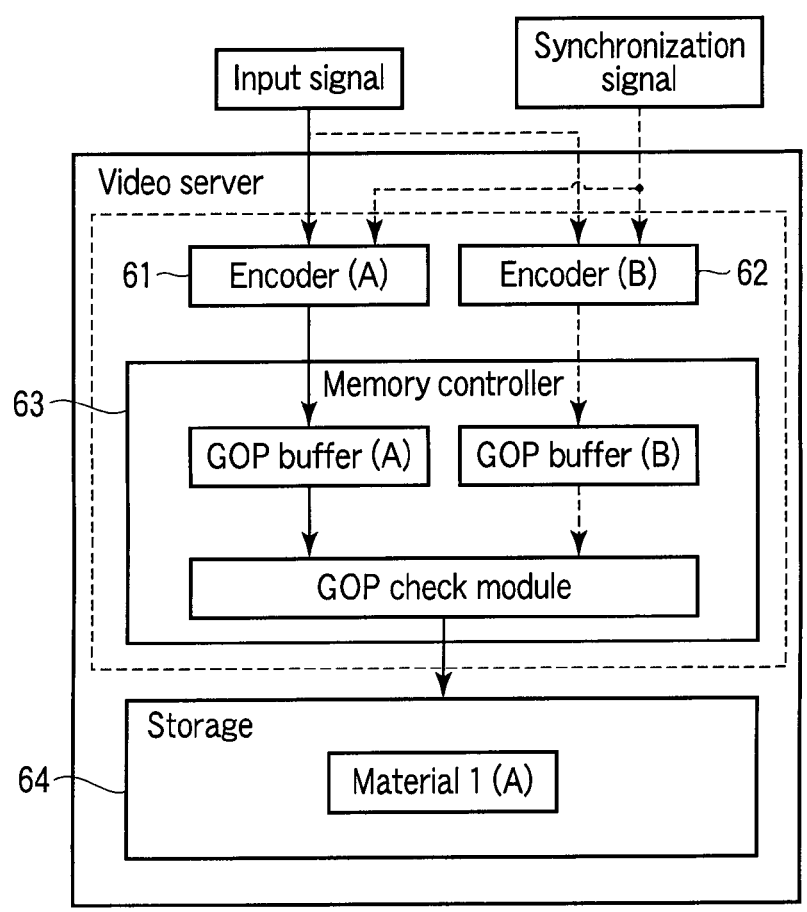
F I G. 8

CONTENTS DATA RECORDING APPARATUS AND CONTENTS DATA RECORDING METHOD

CROSS-REFERENCE TO RELATED APPLICATIONS

This application is based upon and claims the benefit of priority from Japanese Patent Application No. 2010-061530, filed Mar. 17, 2010; the entire contents of which are incorporated herein by reference.

FIELD

Embodiments described herein relate generally to a contents data recording apparatus and a contents data recording method which records, for example, contents data of live and backup broadcast programs.

BACKGROUND

A conventional broadcast program distribution system records contents data of broadcast programs in a video server (a recording apparatus) in advance, reproduces the relevant contents data according to an instruction from an broadcast program distribution controller (APC), and broadcasts the reproduced contents data (e.g., Jpn. Pat. Appln. KOKAI Publication No. H11-316655).

At this time, to comply with a broadcast request reliably, a live system video server and a backup system video server are operated in parallel and the output of the live system video server is used for broadcasting, whereas the output of the backup system video server is configured to replace that of the live system video server if the live system one should malfunction.

In addition, the conventional broadcast program distribution system records contents data of broadcast programs in a video server functioning as a recording apparatus and then confirms whether there is a error by previewing the recorded contents data.

The above method, however, needs a large-scale apparatus to make contents data redundant at the sacrifice of storage resources. Moreover, an error may occur in contents data recorded in a storage when the data is encoded. It has been strongly hoped that only valid contents data with no error will be recorded in the storage. The error, however, cannot be detected until contents data is decoded.

There is a method of performing error detection in a recording stage by use of a codec. Some contents data recorded in storage requires continuity as MPEG2 Open Group of Pictures (GOP) does. The method of using a codec cannot cope with data that requires continuity, such as MPEG2 Open GOP.

BRIEF DESCRIPTION OF THE DRAWINGS

FIG. 1 is a block diagram showing the configuration of an image recording and reproducing apparatus according to an embodiment of a contents data recording apparatus;

FIG. 2 is a block diagram showing a concrete configuration of the image input module shown in FIG. 1;

FIG. 3 is a block diagram showing a concrete configuration of the storage controller shown in FIG. 1;

FIG. 5 is a sequence diagram to explain a recording process when abnormal data has been generated as a result of the detection of an error at an error check module in one recording system in the embodiment;

FIG. 8 is a block diagram showing a video server that performs error detection using a specific data unit before recording by using a conventional doubling configuration using two recording apparatuses.

DETAILED DESCRIPTION

Figure 4:
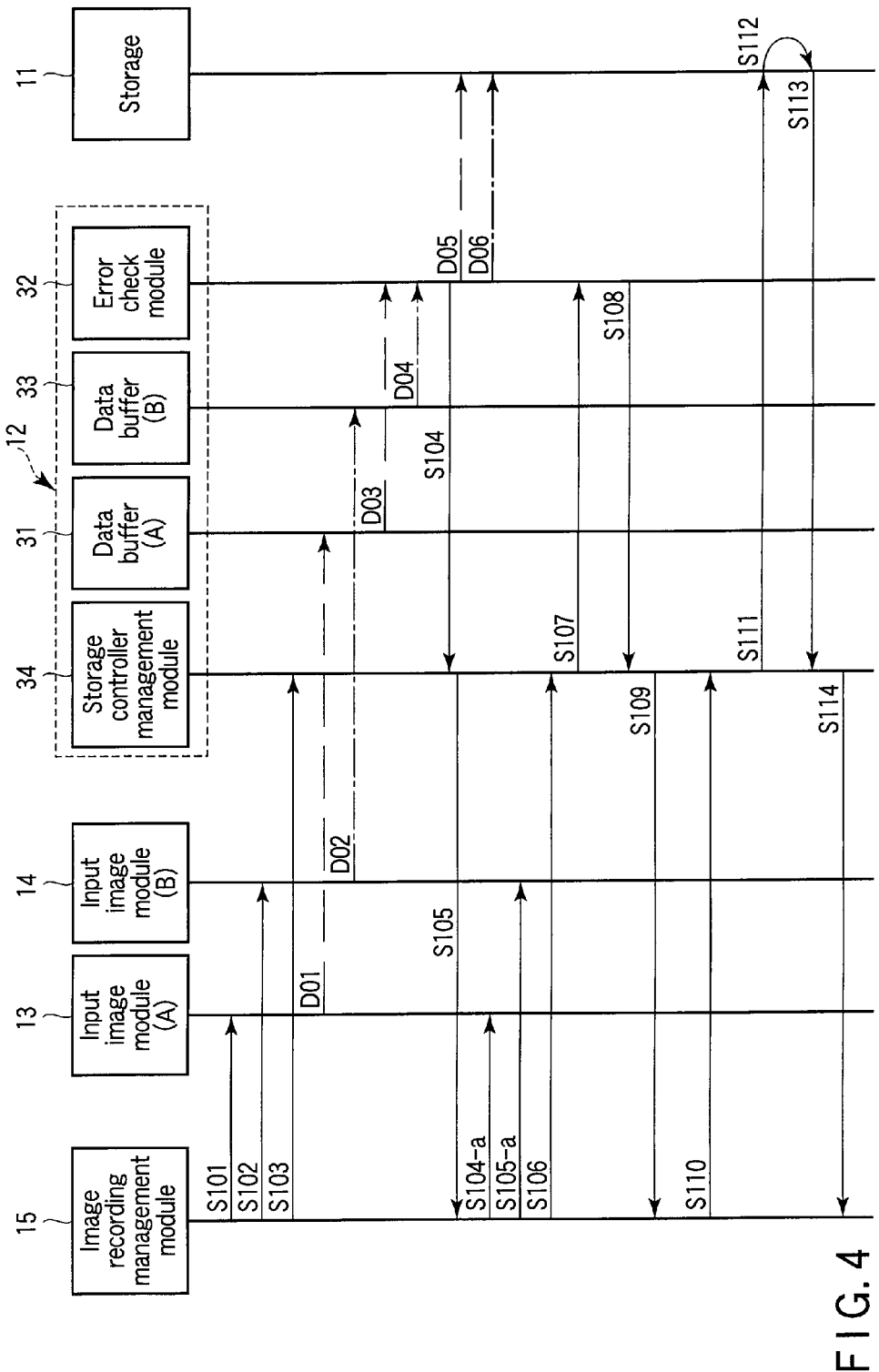
FIG. 4 is a sequence diagram to explain a recording process when contents data from two image input modules is normal in the embodiment.

Hereinafter, referring the accompanying drawings, an embodiment will be explained in detail.

In general, according to one embodiment, a contents data recording apparatus includes a storage module and a data delete module. The storage module stores encoded first-system and second-system contents data. The data delete module deletes either the first-system contents data or second-system contents data from the storage module based on a predetermined condition after the first-system and second-system contents data has been stored in the storage module.

FIG. 1 is a block diagram showing the configuration of an image recording and reproducing apparatus according to an embodiment of a contents data recording apparatus. In FIG. 1, a storage 11 is configured to store live system contents data and backup system contents data (contents data A and contents data B). According to an instruction signal supplied from a storage controller 12, the storage 11 selectively reproduces the corresponding contents data. The reproduced data is decoded by a decoder (not shown) into a video signal. The video signal towards transmitter or equipment as needed.

A video signal to be recorded in the storage 11 is encoded as contents data at a live system image input module 13 and at a backup system image input module 14. The contents data is supplied to the storage controller 12. Then, the storage controller 12 processes the contents data so that the data may be recorded in the storage 11.

An image recording management module 15 functioning as a main controller is configured to perform recording/reproducing control and deleting control of contents data in the storage controller 12 and also perform on/off control of an encoding process of the contents data of the image input modules 13, 14 according to an operation input instruction from an operation terminal 16 or an instruction from an broadcast program distribution controller (APC).

A synchronization signal is supplied to the storage controller 12 and image input modules 13, 14, thereby synchronizing the live system (A system) and backup system (B system) with each other.

FIG. 2 is a block diagram showing a concrete configuration of the image input modules 13, 14. Here, the image input module 13 will be explained as a representative.

A video signal input to an input terminal 21 of the image input module 13 is encoded as contents data by an encoder 22. And the encoded contents data is stored in a data buffer 23. An error detection code adding module 24 adds an error detection code to the contents data stored in the data buffer 23 in, for example, frame units, GOP units, or arbitrary data size units. After the contents data added the error detection code is output to the storage controller 12. A synchronization signal is input to an input terminal 25.

FIG. 3 is a block diagram showing a concrete configuration of the storage controller 12.

The contents data output from the live system image input module 13 is stored in data buffer A 31 and is checked for an error detection code by an error check module 32 functioning as a detector. Then, the contents data checked for an error detection code is recorded in the storage 11. In addition, the contents data output from the backup system image input module 14 is stored in data buffer B 33 and is checked for an error detection code by an error check module 32. Then, the contents data checked for an error detection code is recorded in the storage 11.

The check result of the error check module 32 is supplied to a storage controller management module 34 functioning as a data delete module. Based on the check result of the error check module 32, the storage controller management module 34 deletes contents data in an abnormal system from the storage 11. When both the systems are normal based on the check result of the error check module 32, the storage controller management module 34 causes the contents data in the specified live system to remain in the storage 11 and deletes the contents data in the backup system from the storage 11.

Next, the operation of the above configuration will be explained.

(Recording Normal Data)

FIG. 4 shows a recording process when contents data from the two image input modules 13, 14 is normal. System setting is done by the image recording management module 15. Processing system (live system or backup system) of contents data input the two image input modules 13, 14 is set by the image recording management module 15.

The image recording management module 15 performs recording control of image input module A 13 and image input module B 14 simultaneously (S101, S102). At the start of recording control, the image recording management module 15 specifies the use of encoder A 22 as a live system and encoder B 22 as a backup system for the storage controller management module 34 (S103). Image input module A 13 encodes contents data, adds an error detection code to the encoded data, and transfers the resulting encoded data to data buffer A 31 of the storage controller 12 (D01). Similarly, image input module B 14 encodes contents data, adds an error detection code to the encoded data, and transfers the resulting encoded data to data buffer B 33 of the storage controller 12 (D02).

The encoded data recorded in data buffer A 31 and data buffer B 33 is transferred to the error check module 32 in error-detection-code-added units (D03/D04). The error check module 32 checks for an error detection code and informs the storage controller management module 34 of the check result (S104).

The storage controller management module 34 informs the image recording management module 15 of the check result (S105). When the check result has shown the data is normal, the error check module 32 transfers the data checked for an error detection code to the storage 11 (D05/D06), which records the data. This process is repeated until the recording is terminated when the check result has shown that the data is normal.

When the recording process is terminated, the image recording management module 15 performs recording end control of image input module A 13 and image input module B 14 (S104-*a*/S105-*a*). Then, the image recording management module 15 performs recording end control of the storage controller management module 34 (S106). Then, the storage controller management module 34 transmits a check result request to the error check module 32 (S107). Then, the error check module 32 informs the storage controller management module 34 of a check result response (S108). The storage controller management module 34 informs the image recording management module 15 of the check result response (S109).

When the check result response is normal, the image recording management module 15 performs deletion control of the storage controller management module 34 to delete the data recorded in backup system image input module B 14 (S110).

The storage controller management module 34 performs deletion control of the storage 11 to delete the data in image input module B 14 under the control of the image recording management module 15 (S111). Then, the storage 11 deletes the data in image input module B 14 (S112) and informs the storage controller management module 34 of the deletion result (S113). Then, the storage controller management module 34 informs the image recording management module 15 of the contents data deletion result (S114).

As a result of the above processes, the number of items of contents data recorded in the storage 11 is only one after the recording process of contents data has been completed.

(Recording Process Abnormal Data in One System)

FIG. 5 show a recording process when contents data is determined abnormal data by detecting an error at the error check module 32 in one recording system.

The image recording management module 15 performs recording control of image input module A 13 and image input module B 14 simultaneously (S201, S202). At the start of recording control, the image recording management module 15 specifies the use of encoder A 22 as a live system and encoder B 22 as a backup system for the storage controller management module 34 (S203). Image input module A 13 encodes contents data, adds an error detection code to the encoded data, and transfers the encoded data added error detection code to data buffer A 31 of the storage controller 12 (D11).

Similarly, image input module B 14 encodes contents data, adds an error detection code to the encoded data, and transfers the encoded data added error detection code to data buffer B 33 of the storage controller 12 (D12). The encoded data recorded in data buffer A 31 and data buffer B 33 is transferred to the error check module 32 in error-detection-code-added units (D13/D14). The error check module 32 checks for an error detection code in the encoded data and informs the storage controller management module 34 of the check result (S204).

The storage controller management module 34 informs the image recording management module 15 of the error check result (S205). When the check result has shown that the data is normal, the error check module 32 transfers the data checked for an error detection code to the storage 11 (D15/D16). The storage 11 records the data output the error check module 32. This transferring process is repeated when the check result has shown that the data is normal.

If the error check module 32 has determined that the data in data buffer B transferred from image input module B 14 is abnormal, the check module 32 informs the storage controller management module 34 of the abnormality of the check result (S204-*a*). Then, the storage controller management module 34 informs the image recording management module 15 of the abnormality of the check result (S205-*a*).

The image recording management module 15 receives the check result abnormality notice and controls image input module B 14 and storage controller management module 34 so as to stop recording in the backup system (B system) (S206/S207). Then, the storage controller management module 34 transmits a recording stop response of B system to the image recording management module 15 (S208). From this point on, the image recording management module 15 repeats the recording process only in the live system (A system).

When the recording process has been completed, the image recording management module 15 informs image input module A 13 and storage controller management module 34 of the completion of the live system (A system) recording (S209, S210). After having informed the completion, the image recording management module 15 performs deletion control of the storage controller management module 34 to delete abnormal data in the backup system (B system) (S211).

The storage controller management module 34 controls the storage 11 so as to delete B system data (S212). Then, the storage 11 deletes the data in the B system (S213) and transmits a delete completion response to the storage controller management module 34 (S214). The storage controller management module 34 transmits a delete completion response to the image recording management module 15 (S215). When having received the delete completion response from the storage controller management module 34, the image recording management module 15 completes the recording process.

(Recording Abnormal Data in Both Systems)

While normal data is being recorded, the contents data recording apparatus performs the same process as in "Recording normal data". When abnormal data has occurred, the image recording management module 15 performs recording interrupt control on the system where abnormal data has occurred. When an abnormal data detection notice has been received from both systems, the image recording management module 15 determines that the recording process has failed.

Next three method are considered as method of recording a normal contents data in the storage 11. Three method are a method of doubling the video server system, a method of doubling a recording contents data, and a method of doubling a recording apparatus and performing error detection in specific data units before recording to secure validity.

(Doubling a Video Server System)

Figure 6:
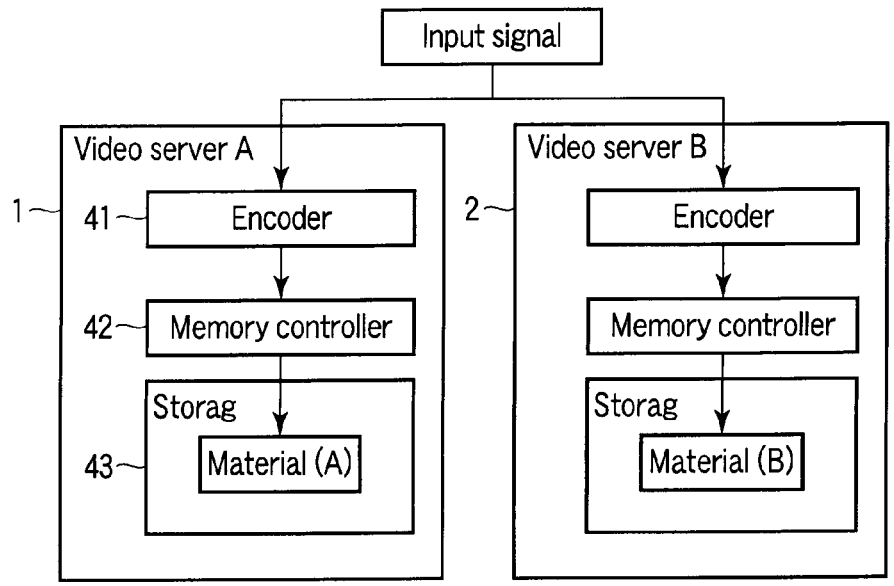
FIG. 6 is a block diagram showing a conventional double configuration using two video servers.

In FIG. 6, video server A1 and video server B2 have the same configuration. Video server A1 is used as a live system and video server B2 is used as a backup system, thereby doubling the system. The encoder 41 of each of video servers A1 and B2 encodes an input signal and transmits the encoded data to a memory controller 42. The memory controller 42 records contents data A (contents data B) in each storage 43. Contents data A is the same as contents data B. If a recording error, or an encode error, has occurred in contents data A, the recording apparatus switches the video server B2 to the live system and video server A1 to the backup system.

In the above configuration, however, the system has not been made redundant. In addition, the system has to be doubled, making the volume and cost of the apparatus double.

(Doubling a Recording Contents Data)

Figure 7:
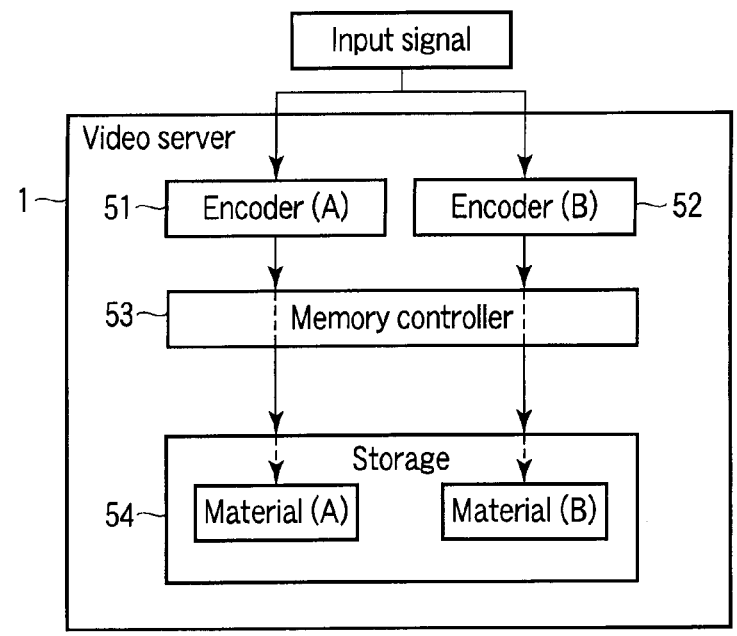
FIG. 7 is a block diagram showing a conventional double configuration of a video server using two encoders.

FIG. 7 shows a video server which performs doubling by using two encoders in recording a contents data and storing two items of contents data in a storage.

An encoder 51 transmits encoded data to a memory controller 53, which then records contents data A in a storage 54. Similarly, an encoder 52 transmits encoded data to the memory controller 53, which then records contents data B in the storage 54, thereby performing doubling.

However, to secure redundancy, it is necessary to record data on a contents data doubly. Since the validity of encoded data cannot be obtained at the time of recording, it is necessary to continue recording two contents data. This makes the consumption of storage resources always double.

(Securing Validity by Doubling a Recording Apparatus and Performing Error Detection in Specific Data Units Before Recording)

FIG. 8 is a block diagram showing the configuration of a video server that doubles a recording apparatus and performs error detection using a specific data unit before recording in a storage 64. When a contents data is recorded in a storage 64, two encoders 61, 62 add an error detection code to input data in specific data units, such as GOP units. Then, a memory controller 63 performs error detection for output data of encoders 61, 62 and stores only normal data in a storage 64, thereby securing the validity of encoded data.

When a codec is based on Closed GOP, data can be replaced in GOP units. However, when data has continuity as Open GOP does, the data cannot be replaced in GOP units. Thereby the recording just has to be interrupted.

Therefore, in the embodiment, the live system contents data and backup system contents data is stored in the storage 11, then contents data in an abnormal system or a selectively specified system is deleted from the storage 11, thereby enabling valid encoded data to be stored in the storage 11 only by a recording process at one image recording apparatus, which helps save storage resources.

As described above, in the embodiment, for example, the live system or backup system is selectively specified for the image recording management module 15, causing, for example, the backup system contents data to be deleted from the storage 11 and only the live system contents data to be left in the storage after the live system and backup system contents data has been stored in the storage 11.

Accordingly, when contents data in both systems is not abnormal, only the live contents data is left in the storage 11, enabling valid encoded data to be stored in the storage only by a recording process at one contents data recording and reproducing apparatus, which helps save the storage capacity of the storage 11.

Furthermore, in the embodiment, the data quality of contents data in each of the live system and backup system is checked at the error check module 32 of the storage controller 12 by using an error detection code added to contents data in each system after encoding performed by the image input modules 13, 14, thereby deleting contents data in an abnormal system from the storage 11.

Therefore, a check can be made to see if there is an abnormality in encoded data without reproducing contents data from the storage 11, which enables only contents data in a normal system to be left in the storage 11.

Moreover, in the embodiment, since an error detection code is added to contents data in each of the live system and backup system in frame units, group of pictures (GOP) units, or arbitrary data size units, a check can be made to see if there is an abnormality in encoded data even if contents data in each system has an open GOP structure, which enables only contents data in a normal system to be left in the storage 11 independently of a codec.

While in the embodiment, data quality in both systems has been checked using an error detection code, data quality may be detected from output data from the image input modules 13, 14 in addition to an error detection code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A contents data recording apparatus comprising:
a first encoding module which encodes input contents data as encoded first-system contents data;
a second encoding module which encodes the input contents data as encoded second-system contents data, wherein the first encoding module and the second encoding module are in a parallel configuration;
a storage module which stores the encoded first-system contents data and the encoded second-system contents data;
a detector which detects the data quality of each of the encoded first-system contents data and the encoded second-system contents data;
a data delete module which deletes either the encoded first-system contents data or the encoded second-system contents data from the storage module based on a detection result of the detector after the encoded first-system contents data and the encoded second-system contents data have been stored in the storage module; and
a main controller which controls the first encoding module or the second encoding module to stop the delivery of contents data in either the first system or second system based on the detection result of the detector,
wherein the data delete module deletes either the encoded first-system contents data or the encoded second-system contents data from the storage module after the delivery of contents data in either the first system or second system has been stopped by the main controller.

2. The contents data recording apparatus according to claim 1, wherein the data delete module deletes either the encoded first-system contents data or encoded second-system contents data selectively specified, when the encoded first-system contents data and the encoded second-system contents data detected by the detector are normal.

3. The contents data recording apparatus according to claim 1, wherein the data delete module deletes contents data in an abnormal system detected by the detector.

4. The contents data recording apparatus according to claim 1, further comprising an error detection code adder which adds an error detection code to each of the encoded first-system contents data and the encoded second-system contents data in specific data units,
wherein the detector performs error detection by checking an error detection code added to each of the encoded first-system contents data and the encoded second-system contents data.

5. The contents data recording apparatus according to claim 4, wherein the error detection code adder adds an error detection code to each of the encoded first-system contents data and the encoded second-system contents data in frame units, group of pictures (GOP) units, or arbitrary data size units.

6. The contents data recording apparatus according to claim 1, further comprising a controller which stops the delivery of contents data in an abnormal one of the first system and second system based on the detection result of the detector.

7. A contents data recording apparatus comprising:
an input signal processor which encodes each of a first-system contents data signal and a second-system contents data signal that include the same contents as the contents data, and wherein the input signal processor encodes the first-system contents data signal and the second-system contents data signal in parallel;
a storage module which stores the first-system contents data signal and the second-system contents data signal encoded by the input signal processor; and
a storage controller which controls the recording and reproducing operations of the storage module and which includes a detector which detects data quality of each of encoded first-system contents data and encoded second-system contents data output from the input signal processor;
a data delete module that deletes either the encoded first-system contents data or the encoded second-system contents data from the storage module based on a detection result of the detector after the first-system contents data signal and the second-system contents data signal have been recorded in the storage module; and
a main controller which controls the input signal processor to stop the delivery of contents data in either the first system or second system based on the detection result of the detector of the storage controller,
wherein the data delete module deletes either the encoded first-system contents data or the encoded second-system contents data from the storage module after the delivery of contents data in either the first system or second system has been stopped by the main controller.

8. The contents data recording apparatus according to claim 7, wherein the data delete module deletes either the encoded first-system contents data or the encoded second-system contents data selectively specified, when the encoded first-system contents data and the encoded second-system contents data detected by the detector are normal.

9. The contents data recording apparatus according to claim 7, wherein the data delete module deletes contents data in an abnormal system detected by the detector.

10. The contents data recording apparatus according to claim 7, wherein the input signal processor includes an error detection code adder which adds an error detection code to each of the first-system contents data signal and the second system contents data signal in specific data units, and
the detector of the storage controller performs error detection by checking an error detection code added to each of the encoded first-system contents data and the encoded second system contents data output from the input signal processor.

11. The contents data recording apparatus according to claim 10, wherein the error detection code adder adds an error detection code to each of the first-system contents data signal and the second-system contents data signal in frame units, group of pictures (GOP) units, or arbitrary data size units.

12. The contents data recording apparatus according to claim 7, wherein the main controller controls the input signal processor to stop the delivery of contents data in an abnormal one of the first system and second system based on the detection result of the detector of the storage controller.

13. A contents data recording method comprising:
encoding, in parallel, each of a first-system contents data signal and a second-system contents data signal that include the same contents as the contents data;
recording each of encoded first-system contents data and encoded second-system contents data in a storage module;
detecting data quality of each of the encoded first-system contents data and the encoded second-system contents data; and
deleting either the encoded first-system contents data or the encoded second-system contents data from the storage module based on a detection result of the detecting after the encoded first-system contents data and the encoded second-system contents data have been stored in the storage module; and stopping the delivery of contents data in either the first system or second system based on the detection result, wherein the deleting comprises deleting either the encoded first-system contents data or the encoded second-system contents data from the storage module after the delivery of contents data in either the first system or second system has been stopped.

* * * * *